United States Patent [19]

Rakieski

[11] Patent Number: 5,613,518
[45] Date of Patent: Mar. 25, 1997

[54] DEVICE FOR RESTRICTING EXCESS FLOW

[75] Inventor: Kenneth E. Rakieski, Gifford, Pa.

[73] Assignee: Dresser Industries, Inc., Dallas, Tex.

[21] Appl. No.: 391,586

[22] Filed: Feb. 21, 1995

[51] Int. Cl.$^6$ .................................................. F16K 15/02
[52] U.S. Cl. ........................................ 137/513.5; 137/517
[58] Field of Search .......................... 137/517, 519, 137/519.5, 498, 513.3, 513.5

[56] References Cited

U.S. PATENT DOCUMENTS

| | | | |
|---|---|---|---|
| 1,764,181 | 5/1927 | Raetz et al. | |
| 2,245,271 | 6/1941 | Guill | 137/517 |
| 2,569,176 | 3/1946 | Katcher | 251/144 |
| 2,574,851 | 6/1948 | Wagner | 251/27 |
| 2,821,209 | 1/1953 | Waterman | 137/498 |
| 2,886,061 | 5/1959 | Smith et al. | 137/517 |
| 2,929,399 | 3/1960 | Magowan | 137/517 X |
| 2,968,315 | 1/1961 | Fisher | 137/517 |
| 3,122,162 | 2/1964 | Sands | 137/517 |
| 3,380,474 | 4/1968 | Mills | 137/517 |
| 3,561,471 | 2/1971 | Sands | 137/517 X |
| 3,794,077 | 2/1974 | Fanshier | 137/513.3 |
| 3,861,414 | 1/1975 | Peterson, II | 137/512.3 |
| 4,010,770 | 3/1977 | Peters | 137/492.5 |
| 4,049,016 | 9/1977 | Henry | 137/498 |
| 4,605,039 | 8/1986 | Johnson et al. | 137/460 |
| 4,736,889 | 4/1988 | Stephenson | 239/204 |
| 4,809,740 | 3/1989 | Nevlud | 137/460 |
| 4,830,046 | 5/1989 | Holt | 137/460 |
| 4,958,657 | 9/1990 | Hagan et al. | 137/513.5 |
| 5,215,113 | 6/1993 | Terry | 137/460 |
| 5,441,202 | 8/1995 | Wintering | 137/517 X |

FOREIGN PATENT DOCUMENTS 1301426  7/1961  France ................. 137/519.5

OTHER PUBLICATIONS

"DRESSER® Style 488–XSF Excess Flow Device", Form No. XSF–1090, published prior to 1994.

Primary Examiner—Stephen M. Hepperle
Attorney, Agent, or Firm—Sidley & Austin

[57] ABSTRACT

A device (11) for restricting excess flow through a conduit (34) includes a unitary injection molded tubular body (12) having a bore (13) in which an annular valve seat (21) and a spring support shoulder (19) are formed. A poppet valve member (22) is positioned within the bore (13) and is biased away from the valve seat (21) by a compression spring (26). The inlet section of the tubular body (12) has a plurality of longitudinally extending arms (27) forming longitudinally extending fluid passageways (28) therebetween to provide bypasses around the poppet valve member (22) when the poppet valve member (22) is in its open position. The arms (27) are spaced apart about the outer periphery of the inlet section, and the distal end (27a) of each arm (27) has a radially inwardly projecting element (31) to retain the poppet valve member (22) in the bore (13). However, the arms (27) are flexible such that the distal ends (27a) can be moved radially outwardly sufficiently to permit the insertion of the poppet valve member (22) therebetween into the bore (13) during the fabrication of the device. A bleed passageway (29) can be provided for automatic reset of the device.

3 Claims, 3 Drawing Sheets

DEVICE FOR RESTRICTING EXCESS FLOW

FIELD OF THE INVENTION

The invention relates to a device for restricting excess flow of fluid through a conduit. In a particular aspect, the invention relates to a device for restricting the excess flow of natural gas when an abnormal surge in flow occurs, e.g. as a result of a rupture in the gas line downstream of the device.

BACKGROUND OF THE INVENTION

In order to enhance the safety of the distribution of natural gas through pipes, an excess flow device can be provided at a suitable location in a pipe to protect the distribution system downstream of the device against the occurrence of a emergency situation such as a catastrophic rupture of a downstream component of the distribution system. For example, such a device can be placed in each individual service line adjacent the connection of the individual service line to the main distribution line. One such device is the Dresser Style 488-XSF excess flow device. This device can be used in a variety of pipe fittings without the requirement of any additional fittings or installation steps. The device comprises an insert stiffener body having an outwardly extending retention flange, an annular valve seat at one end of a valve chamber, a poppet positioned in the valve chamber, a retaining washer to retain the poppet in the valve chamber, and a spring which biases the poppet away from the valve seat to balance the poppet in an open position against normal anticipated gas flow. The poppet has a polygonal outer periphery to permit gas to flow between the poppet and the inner wall of the insert stiffener body under normal flow conditions. When a flow surge of predetermined magnitude occurs, the device is actuated to closure, automatically controlling the flow of gas and alleviating a hazardous condition. A shallow groove in the back face of the poppet permits a minimal, controlled amount of gas to bleed by the poppet after closure in order to provide for automatic reset of the valve. Once the downstream line has been repaired and the pressure is substantially equalized on both sides of the poppet, the poppet automatically resets, making it unnecessary to excavate and manually reset the device in order to restore service to the downstream portion of the distribution system. The insert stiffener body, the spring and the retaining washer are generally formed of steel, while the poppet is generally formed of a polymeric material such as a blend of polycarbonate and polyester. While this device performs satisfactorily in many environments, it is not universally recommended. For example, the Dresser Style 488-XSF device having an external diameter of 0.5 inch is not recommended for use when the system pressure is less than 7 psig as the service line and size may be incapable of passing enough flow to trip the device at lower pressures. Also, the pressure drop across this device is 14.75" water (0.53 psi) ±5% at 10 psi and 250 SCFH flow for the 0.5" external diameter unit.

Thus, there is a need to provide an excess flow device which does not require complicated fittings, which can be employed in smaller diameter pipes, which exhibits a smaller pressure drop, and which can be employed with lower system pressures.

SUMMARY OF THE INVENTION

In accordance with the invention, a device for restricting excess flow through a conduit includes a tubular body having a bore in which an annular valve seat and a spring support shoulder are formed. A poppet valve member is positioned within the bore and is biased away from the valve seat by a compression spring. The inlet section of the tubular body has a plurality of longitudinally extending fluid passageways to provide bypasses around the poppet valve member when the poppet valve member is in its open position.

In a presently preferred embodiment, the tubular body is a unitary injection molded article having an inlet section in the form of a plurality of longitudinally extending arms forming the longitudinally extending fluid passageways therebetween. The arms are spaced apart about the outer periphery of the inlet section, and the distal end of each arm has a radially inwardly projecting element to retain the poppet valve member in the bore. The arms are flexible such that the distal ends can be moved radially outwardly sufficiently to permit the insertion of the poppet valve member therebetween into the bore during the fabrication of the device. A bleed passageway can be provided for automatic reset of the device.

DETAILED DESCRIPTION OF BEST MODE

Figure 1:
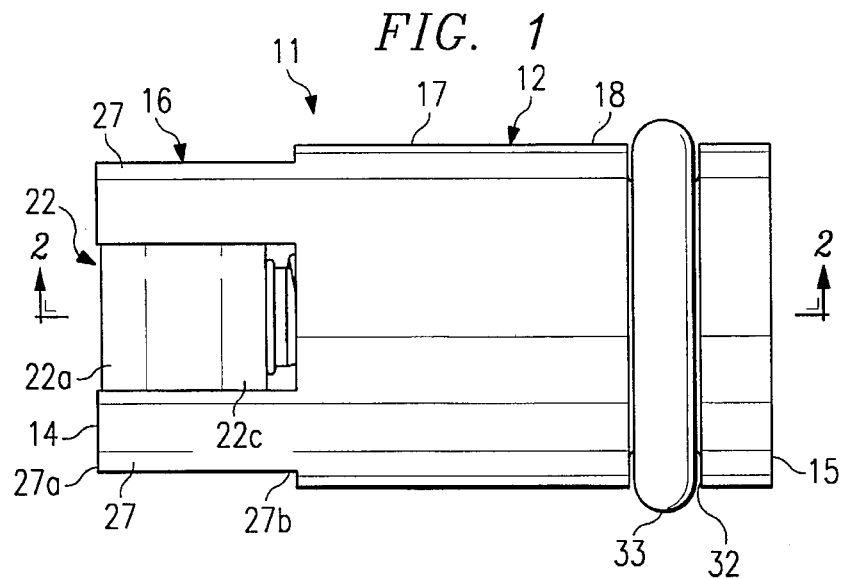
FIG. 1 is a side elevational view of a device in accordance with the present invention.
Figure 2:
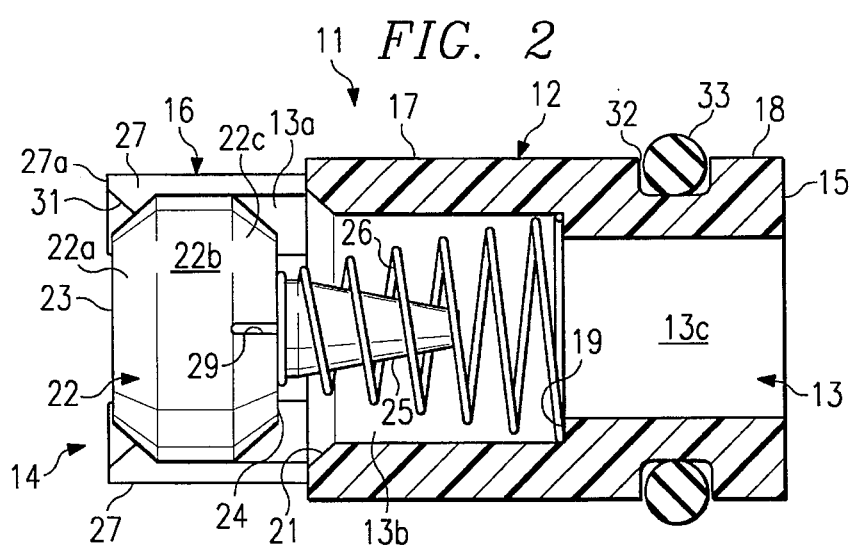
FIG. 2 is a partial cross-sectional view taken along line 2—2 in FIG. 1.
Figure 3:
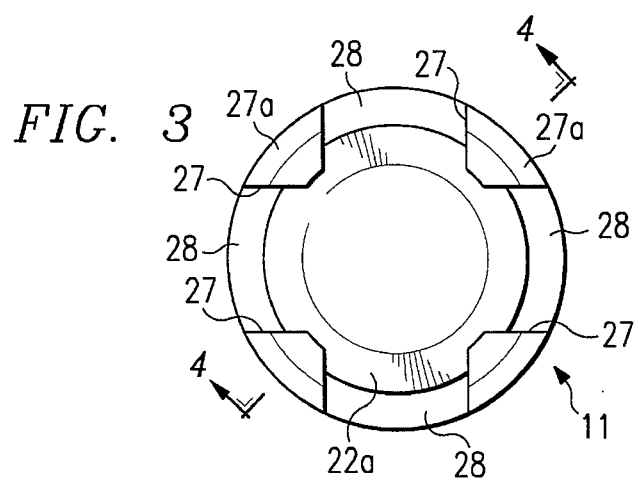
FIG. 3 is an end view of the left end of the device of FIG. 1.

FIGS. 1–3 illustrate a presently preferred embodiment of a device 11 for restricting excess flow through a conduit in accordance with the present invention. With regard to FIG. 2, only the tubular body 12 and the O-ring 33 are presented in cross-section. The device 11 comprises a tubular body 12 having a bore 13 extending along a longitudinal axis of the tubular body 12 from an inlet end 14 of the tubular body 12 to an outlet end 15 of the tubular body 12. The tubular body 12 is a single unitary injection molded element formed of a synthetic polymeric material and comprises an inlet body section 16, a second body section 17, and a third body section 18 sequentially spaced along the longitudinal axis of the tubular body 12, with the inlet body section 16 forming an inlet bore section 13a of the bore 13, the second body section 17 forming a second bore section 13b of the bore 13, and the third body section 18 forming a third bore section 13c of the bore 13. Each of the bore sections 13a, 13b, and 13c has an at least generally circular cross-section in a plane perpendicular to the longitudinal axis of tubular body 12.

The second body section 17 joins the inlet body section 16 to form an annular valve seat 21 which is located at the junction of the second bore section 13b and the inlet bore section 13a and facing the inlet bore section 13a. In the illustrated embodiment, the annular valve seat 21 has a frustoconical configuration with the frustoconical surface converging in a direction towards the intermediate bore section 13b so that its smaller end joins the intermediate bore section 13b and its larger end joins the inlet bore section 13a. The third body section 18 joins the second body section 17 to form an annular shoulder 19 at the junction of the second bore section 13b and the third bore section 13c, with the annular shoulder 19 facing the second bore section 13b.

A poppet valve member 22 is coaxially positioned in the inlet bore section 13a for movement along the longitudinal axis of the tubular body 12. The poppet valve member 22 has first, second, and third coaxially aligned sections extending in sequence between an upstream end 23 and a downstream end 24. The first poppet section 22a has a generally frustoconical outer surface converging in a direction toward the inlet end 14 of the tubular body 12, while the third poppet section 22c has a generally frustoconical outer surface converging in a direction toward the outlet end 15 of the tubular body 12, and the second poppet section 22b has a generally cylindrical outer surface connecting the first poppet section 22a with the third poppet section 22c. A spring positioning element 25 is positioned coaxially with and secured to the poppet valve member 22 and has a generally frustoconical outer surface converging in a direction toward the outlet end 15 of the tubular body 12, with its maximum diameter being less than the minimum diameter of the third poppet section 22c, so that a radially outwardly extending shoulder 24 is formed at the junction of the third poppet section 22c and the spring positioning element 25. The poppet valve member 22 and the spring positioning element 25 can be fabricated as a unitary injection molded article formed from a synthetic polymeric material. While any suitable material, including metal, synthetic polymeric material, etc., can be utilized to form the tubular body 12, the poppet valve member 22 and the spring positioning element 25, a synthetic thermoplastic polymer, e.g., the Celcon™ acetal copolymer, based on copolymerization of trioxane and cyclic ethers, is presently preferred.

A conical compression spring 26 is positioned about the spring positioning element 25, with the large end of the conical spring 26 being in contact with the annular shoulder 19 and the small end of the conical spring 26 being in contact with the annular shoulder 24 formed by the third poppet section 22c. Thus, the spring 26, which is in compression between shoulders 19 and 24, biases the poppet valve member 22 away from the annular valve seat 21. The spring constant of spring 26 is selected such that the force imparted to poppet valve member by a predetermined maximum desired flow rate of fluid through the bore 13 is insufficient to compress the spring to the point that the poppet valve member 22 would contact, but the force imparted to poppet valve member by a flow rate of fluid through the bore 13 which is greater than the predetermined maximum desired flow rate is sufficient to compress the spring to the point that the poppet valve member 22 contacts the valve seat 21 and shuts off the fluid flow through the bore 13. The flow rate which is greater than the predetermined maximum desired flow rate can be the result of a break in the conduit downstream of the device 11 or any other unexpected event which causes an unexpected large drop in pressure at the downstream end of the device 11.

The inlet body section 16 has a plurality of longitudinally extending arms 27, with each of the arms 27 having an upstream end 27a and a downstream end 27b. The downstream end 27b of each arm 27 is joined to the downstream ends 27b of adjacent arms 27 and to the second body section 17. The upstream ends 27a of the arms 27 are free of connection to each other, and the arms 27 are spaced apart about the outer periphery of the inlet body section 16 so that a plurality of longitudinally extending fluid passageways 28 are formed by the arms 27, with each fluid passageway 28 being a space between an adjacent pair of the arms 27. Each of the plurality of longitudinally extending fluid passageways 28 formed in the inlet body section 16 extends radially outwardly from the inlet bore section 13a to the outer periphery of the inlet body section 16 and extends longitudinally at least from adjacent to the upstream end 23 of the poppet valve member 22 to adjacent to the shoulder 24 at the downstream end of the poppet section 22c when the poppet valve member 22 is positioned away from the annular valve seat 21, in order to provide fluid communication around the poppet valve member 22 when the poppet valve member 22 is positioned away from the annular valve seat 21. On the other hand, the poppet valve member 22 at least substantially interrupts fluid communication between the fluid passageways 28 and the second bore section 13b when the poppet valve member 22 contacts the annular valve seat 21.

In the illustrated embodiment of the invention, there are four arms 27 forming four longitudinally extending passageways 28. However, while it is desirable to maximize the width of the passageways 28 while maintaining adequate strength in the arms 27, any desired number of arms 27 can be employed. The cross-section of the arms 27 perpendicular to the longitudinal axis of the device 11, other than the end portions which include the elements 31, can be that of a section of an annulus, as illustrated, or circular or oval or any other desired configuration. Similarly, the cross-section of each passageway 28 perpendicular to the longitudinal axis of tubular body 12 can have any desired shape. However, it is desirable that the passageways 28 extend radially outward to the periphery of the tubular body 12 and that the width of the radially outer portion of the passageway 28 be at least as great, and preferably greater, than the width of the radially inner portion of the passageway 28, as this increases the cross-sectional area of the passageway 28 available for a device 11 of given diameter.

In one version of the device 11, the poppet valve member 22 completely stops fluid communication between the fluid passageways 28 and the second bore section 13b when the poppet valve member 22 contacts the annular valve seat 21. In the illustrated version of the device 11, the poppet valve member 22 is provided with a small longitudinally extending passageway 29 to permit a substantially reduced flow of fluid between the fluid passageways 28 and the second bore section 13b when the poppet valve member 22 contacts the annular valve seat 21. Once the poppet valve member 22 has been moved against the annular valve seat 21 by an excessive flow rate of fluid through the bore 13 and the cause of the excessive flow has been corrected, this bleed flow permits the poppet valve member 22 to automatically reset itself by gradually raising the fluid pressure in bore section 13c until the force exerted on the poppet valve member 22 by the compressed spring 26 is sufficient to move the poppet valve member 22 away from the annular valve seat 21.

By having each of the plurality of longitudinally extending fluid passageways 28 extend radially outwardly from the inlet bore section 13a to the outer periphery of the inlet body section 16, each passageway 28 can have the maximum cross-section for fluid flow which is available for a given diameter of the device 11, a given angular width of passageway 28 in a plane perpendicular to the longitudinal axis of device 11, and a given diameter of poppet valve member 22. In comparison to excess flow devices where the flow passageways are spaced inwardly from the periphery of the device, this feature of the present invention permits the device 11 to be employed in smaller diameter conduits without increasing the pressure drop across the device 11 under normal flow conditions. It also permits the device 11 to have a smaller pressure drop for a given conduit diameter than excess flow devices where the flow passageways are spaced inwardly from the periphery of the device.

Figure 6:
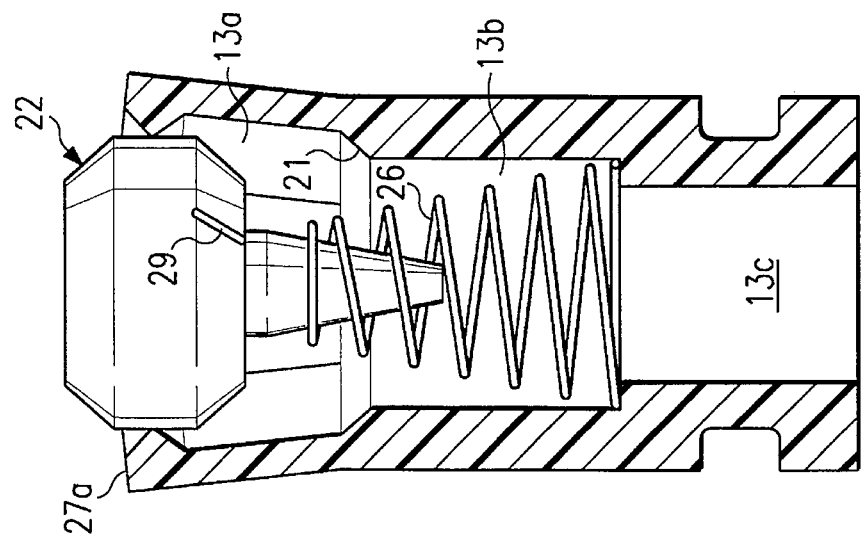
FIG. 6 is a partial cross-sectional view, similar to FIG. 4, at an intermediate stage in the fabrication of the device.
Figure 5:
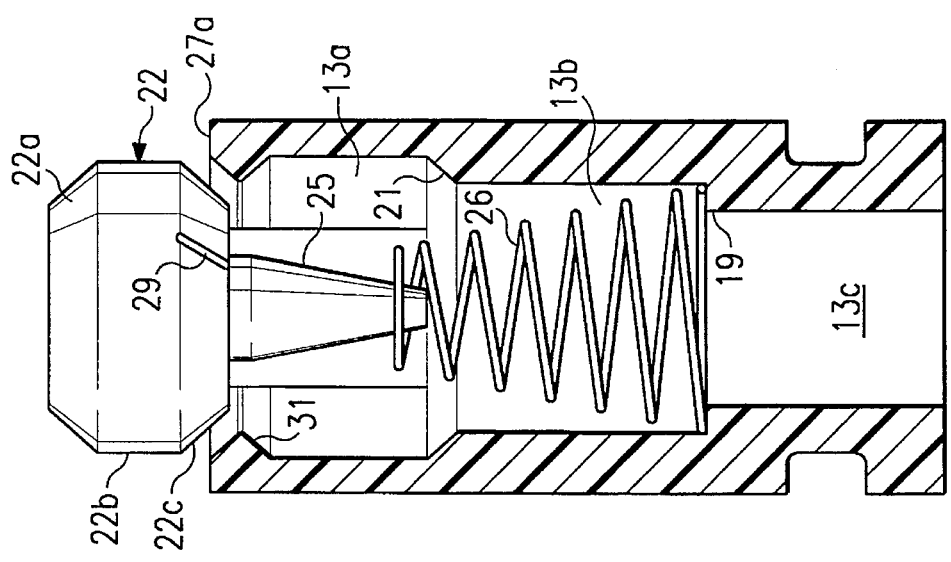
FIG. 5 is a partial cross-sectional view, similar to FIG. 4, at an initial stage in the fabrication of the device.
Figure 4:
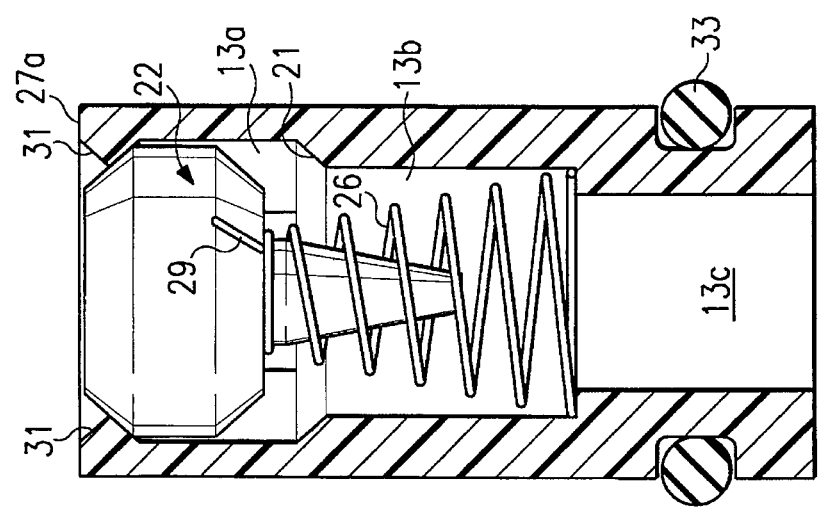
FIG. 4 is a partial cross-sectional view taken along line 4—4 in FIG. 3.

Referring now to FIGS. 4–6, the upstream end 27a of each of the arms 27 has a radially inwardly projecting element 31 such that the radially inwardly projecting elements 31 retain the poppet valve member 22 in the inlet bore section 13a. However, the arms 27 are sufficiently flexible that the upstream ends 27a of the arms 27 can be moved radially outwardly sufficiently to permit the insertion of the poppet valve member 22 between the inwardly directed elements 31 and into the inlet bore section during the fabrication of the device.

Thus, FIG. 5 illustrates the device 11 at a fabrication stage where the spring 26 has already been inserted into the intermediate bore section 13b but the poppet valve member 22 has not been inserted into the tubular member 11. The diameter of the outlet bore section 13c is smaller than the diameter of the intermediate bore section 13b, which in turn is smaller than the diameter of the inlet bore section 13a. As the diameter of the large end of the spring 26 can be equal to or smaller than the opening represented by the innermost ends of elements 31, the spring 26 can be readily inserted into the tubular member 11 and positioned against the shoulder 19. While the maximum diameter of the poppet valve member 22 is less than the diameter of inlet bore section 13a, it is greater than the diameter of the opening represented by the innermost ends of elements 31. However, the arms 27 are sufficiently flexible such that the distal ends 27a can be moved radially outwardly sufficiently for the maximum diameter portion of the poppet valve member 22 to readily pass therebetween, as illustrated in FIG. 6, and into the inlet bore section 13a, as illustrated in FIG. 4.

The upstream side of the inwardly projecting elements 31 collectively form segments of a frustoconical surface which converges in a direction toward the downstream end of the tubular body 12 so as to cooperate with the frustoconical surface of third poppet section 22c in forcing the upstream ends 27a of the arms 27 radially outwardly during the insertion of the poppet valve member 22 into the inlet bore section 13a of the tubular body 12. The downstream side of the inwardly projecting elements 31 collectively form segments of a frustoconical surface which mates with the frustoconical surface of first poppet section 22a, thereby assisting in maintaining the poppet valve member 22 centered in inlet bore section 13a when the spring 26 is extended to the maximum extent. As the inwardly projecting elements 31 are preferably integrally formed with the arms 27 as part of the unitary injection molded article 12, the presence of the inwardly projecting elements 31 avoids the necessity of providing a separate retention ring to retain the poppet valve member 22 in the inlet bore section 13a, thereby reducing the number of parts in the device 11 and simplifying the fabrication of the device 11.

The tubular body 12 has an annular groove 32 in an outer surface of the tubular body 12, preferably in the outer surface of the third body section 18 which has the greatest wall thickness. The centerline of the annular groove 32 is preferably in a plane which is perpendicular to the longitudinal axis of the tubular body 12. An annular elastomeric member 33 is positioned in the annular groove 32. In the illustrated embodiment of the invention, the annular elastic member 33 is an O-ring which has a radial dimension greater than the radial depth of groove 32.

Figure 7:
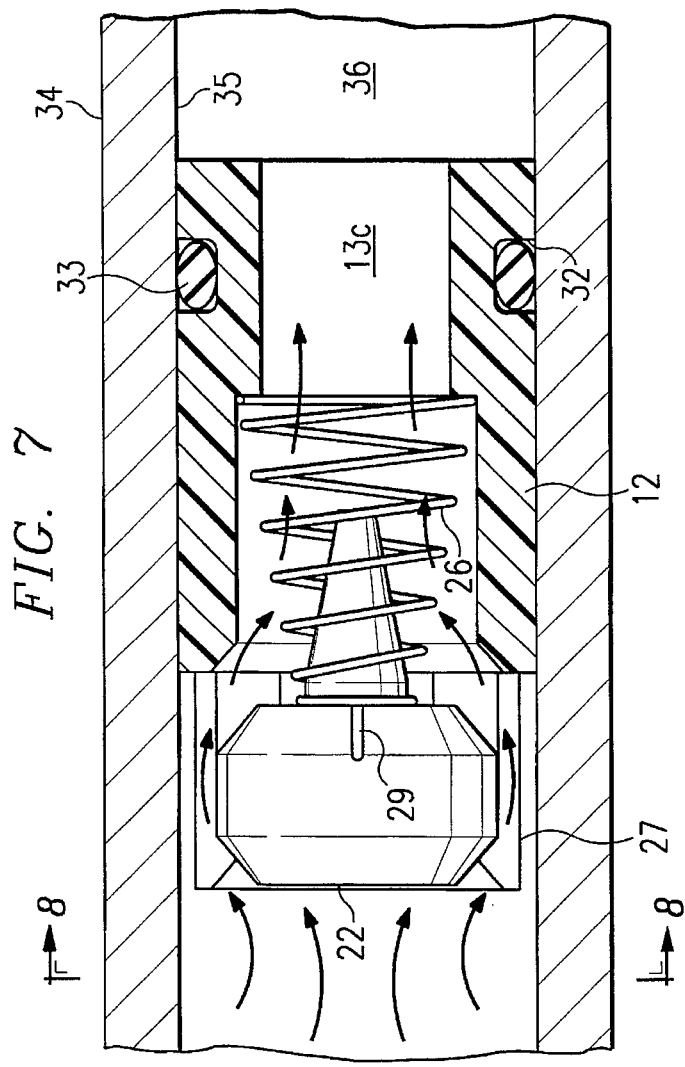
FIG. 7 is a partial cross-sectional view taken along the longitudinal axis of the device of FIG. 1 inserted within a conduit for restricting excess flow of fluid through the conduit.
Figure 8:
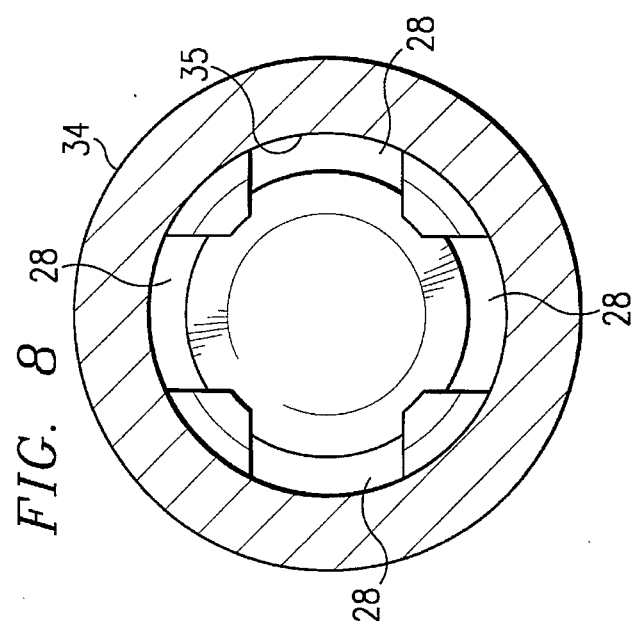
FIG. 8 is a cross-sectional view taken along line 8—8 in FIG. 7.

As illustrated in FIGS. 7 and 8, the device 11 is particularly useful in connection with a conduit 34 which has an inner wall 35 forming a flow passageway 36 through the conduit, and wherein the tubular body 12 has an outer diameter slightly smaller than the diameter of the flow passageway 36 through the conduit 34 so that all of the device 11 can be inserted into the flow passageway 36 with the annular elastic member 33 providing a sealing engagement with the inner wall 35 of the conduit 34. The elastomeric member 33 not only provides a seal for the small annulus between the exterior of the tubular wall 12 and the interior wall 35 of the conduit 34, it also serves as a means for retaining the device 11 at the desired position within the conduit 34. Where the conduit 34 is formed by butt welding sections of conduit together, the butt welding operation generally forms a radially inwardly extending bead around the internal circumference of the butt weld joint. Thus, the internal bead of the first butt weld joint in conduit 34 downstream of the device 11 can serve as a barrier to further movement of the device 11 along the conduit 34. The normal flow of fluid through conduit 34 and device 11 is illustrated by the arrows in FIG. 7. When a flow surge of predetermined magnitude occurs, the poppet valve member 22 is forced to move in the downstream direction, compressing spring 26, until the poppet valve member 22 contacts annular valve seat 21, thereby automatically terminating the fluid flow through the conduit 34 (except for the bleed flow through bleed passageway 29), alleviating a hazardous condition. After closure of the poppet valve member 22 against the annular valve seat 21, a bleed passageway, if present in the device 11, permits a minimal, controlled amount of fluid to bleed by the annular valve seat 21 in order to provide for automatic reset of the poppet valve member 22. Once the downstream line has been repaired and the pressure is sufficiently restored on the downstream side of the poppet valve member 22 for the spring 26 to overcome the upstream force on the poppet valve member 22, the poppet valve member 22 automatically resets.

One embodiment of a device in accordance with the present invention having a 7/16" external diameter exhibits a pressure drop across the device of 10.2" water (0.367 psi) at 10 psi and 250 SCFH flow. Thus, this device exhibits a lower pressure drop than the ½" external diameter size Dresser Style 488-XSF for the same flow conditions, and it can also be activated at a lower pressure than the Dresser Style 488-XSF.

Reasonable variations and modifications are possible within the scope of the foregoing description, the drawings and the appended claims to the invention. For example a cylindrical spring can be employed instead of the conical spring 26. The number of flow passageways 28 can be either less than or greater than the four illustrated passageways. Each bleed passageway can be formed in the tubular member 12 instead of in the poppet valve member 22. Similarly, each bleed passageway can extend through the body of the poppet valve member 22 instead of being a groove 29 in the surface of the poppet valve member 22. The poppet valve member 22 can have an arcuate configuration rather than the combination of cylindrical and frustoconical surfaces, and the valve seat 21 and the downstream face of elements 31 can have an arcuate configuration which matches that of the poppet valve member 12. While one O-ring 33 has been illustrated, two or more sealing rings can be employed in the exterior surface of the tubular body 12. The periphery of the downstream end of the tubular member can be provided with one or more circumferentially extending ridges to engage the inner wall 35 of conduit 34 and thereby deter undesired movement of the device 11 in the conduit 34. While the bore sections 13b and 13c are illustrated as being cylindrical, any other suitable configuration can be employed.

That which is claimed is:

1. A device for restricting excess flow through a conduit, said device comprising:

a tubular body having a bore extending along a longitudinal axis of said tubular body from an inlet end of said tubular body to an outlet end of said tubular body;

wherein said tubular body comprises an inlet body section and a second body section, said inlet body section forming an inlet bore section of said bore, said second body section forming a second bore section of said bore, said second body section joining said inlet body section to form an annular valve seat, said annular valve seat being located at a junction of said second bore section and said inlet bore section and facing said inlet bore section;

a poppet valve member positioned in said inlet bore section for movement along the longitudinal axis of said tubular body, said poppet valve member having an upstream end and a downstream end; and a spring biasing said poppet valve member away from said annular valve seat;

said inlet body section having a plurality of longitudinally extending fluid passageways formed therein, extending at least from adjacent to said upstream end of said poppet valve member to adjacent to said downstream end of said poppet valve member when said poppet valve member is positioned away from said annular valve seat, in order to provide fluid communication around said poppet valve member when said poppet valve member is positioned away from said annular valve seat, said poppet valve member at least substantially interrupting fluid communication between said fluid passageways and said second bore section when said poppet valve member contacts said annular valve seat;

wherein each of the plurality of longitudinally extending fluid passageways formed in said inlet body section extends radially outwardly from said inlet bore section to the outer periphery of said inlet body section;

wherein said inlet body section comprises a plurality of longitudinally extending arms, each of said arms having an upstream end and a downstream end, the downstream end of each arm being joined to downstream ends of adjacent arms, the upstream ends of said arms being free of connection to each other, said arms being spaced apart about the outer periphery of said inlet body section so that each of said plurality of longitudinally extending fluid passageways is a space between an adjacent pair of said arms;

wherein the upstream end of each of said arms has a radially inwardly projecting element such that the radially inwardly projecting elements retain said poppet valve member in said inlet bore section;

wherein the arms are sufficiently flexible such that the upstream ends of the arms can be moved radially outwardly sufficiently to permit the insertion of said poppet valve member therebetween into said inlet bore section during the fabrication of said device;

wherein said tubular body has an annular groove in an outer surface of said tubular body, wherein an annular elastic member is positioned in said annular groove, wherein said conduit has an inner wall forming a flow passageway through said conduit, and wherein said tubular device has an outer diameter slightly smaller than a diameter of the flow passageway through said conduit so that said device can be inserted into said flow passageway through said conduit with said annular elastic member providing a sealing engagement with the inner wall of said conduit;

wherein said tubular body further comprises a third body section, said third body section forming an outlet bore section of said bore, said third body section joining said second body section to form an annular shoulder at the junction of said second bore section and said third bore section, said annular shoulder facing said second bore section;

wherein said spring is positioned in said second bore section between and in contact with said annular shoulder and said downstream end of said poppet valve member;

wherein said annular groove is formed in said third body section;

wherein said tubular body is a single unitary injection molded element formed of a synthetic polymeric material; and wherein said annular elastic member is an O-ring.

2. A device in accordance with claim 1, wherein said poppet valve member comprises first, second, and third coaxially aligned sections, said first section having a generally frustoconical outer surface converging in a direction toward said inlet end of said tubular body, said third section having a generally frustoconical outer surface converging in a direction toward said outlet end of said tubular body, said second section having a generally cylindrical outer surface connecting said first section with said third section; a spring retention member coaxially connected to a downstream end of said second section, said spring retention member having a generally frustoconical outer surface converging in a direction toward said outlet end of said tubular body and having a maximum diameter which is less than a minimum diameter of said third section; and wherein said spring is a conical spring positioned about said spring retention member section and having its large end in contact with said annular shoulder and its small end in contact with said third section.

3. A device in accordance with claim 2, wherein said poppet valve member has a bleed passageway therein which permits a substantially reduced flow through said device when said poppet valve member is seated against said valve seat.

* * * * *